United States Patent
Amagasa et al.

[19]

[11] Patent Number: 5,923,137

[45] Date of Patent: Jul. 13, 1999

[54] MOTOR-CONTROLLED WINDSHIELD WIPER SYSTEM

[75] Inventors: Toshiyuki Amagasa; Ryoji Shagawa, both of Gunma-ken, Japan

[73] Assignee: Mitsuba Corporation, Gunma-ken, Japan

[21] Appl. No.: 08/797,808

[22] Filed: Feb. 7, 1997

[30] Foreign Application Priority Data

Feb. 8, 1996 [JP] Japan .................................. 8-046571

[51] Int. Cl.⁶ ............................................... H02P 1/00
[52] U.S. Cl. ............................................ 318/443; 318/444
[58] Field of Search .............................. 318/DIG. 2, 443, 318/444, 280, 282, 283, 286, 467, 468, 287, 293

[56] References Cited

U.S. PATENT DOCUMENTS

| | | | |
|---|---|---|---|
| 4,733,147 | 3/1988 | Muller et al. | 318/443 |
| 4,742,280 | 5/1988 | Ishikawa et al. | 318/282 |
| 5,568,026 | 10/1996 | Welch | 318/443 |
| 5,654,616 | 8/1997 | Suriano et al. | 318/443 |

FOREIGN PATENT DOCUMENTS

| | | |
|---|---|---|
| 3-48049 | 7/1991 | Japan . |
| 5-83424 | 11/1993 | Japan . |
| 7-165023 | 6/1995 | Japan . |
| 8-156748 | 6/1996 | Japan . |

Primary Examiner—William M. Shoop, Jr.
Assistant Examiner—Rina Ivonne Duda
Attorney, Agent, or Firm—Skjerven, Morrill, MacPherson, Franklin & Friel LLP

[57] ABSTRACT

In a wiper system using a reversible motor for reciprocating angular movement of a wiper arm, a separate relay and a separate position detecting segment are used for selectively defining a path for regenerative braking. Because the third relay and the third position detecting segment are provided separately from those used for controlling the power supply of the electric motor, and are therefore relatively free from any large time constant, it is possible to start the regenerative braking action at a prescribed angular location without involving any substantial time lag so that the wiper arm can be stopped at a prescribed angular position at each terminal point at high precision at all times.

3 Claims, 3 Drawing Sheets

MOTOR-CONTROLLED WINDSHIELD WIPER SYSTEM

TECHNICAL FIELD

The present invention relates to a windshield wiper system which effects the reciprocating movement of a wiper arm by reversing the rotational direction of an electric motor.

BACKGROUND OF THE INVENTION

Conventionally, an automotive wiper system typically includes a linkage mechanism for converting the rotational output of an electric motor to a reciprocating sweeping movement of a wiper arm. It is however possible to do away with such a linkage mechanism by controlling the motor so as to alternatingly reverse the rotational direction of the output of the electric motor, and directly transmitting this movement to the wiper arm.

FIG. 1 shows a circuit diagram of a previously proposed prior art windshield wiper system which effects the reciprocating movement of a wiper arm by reversing the rotational direction of an electric motor. The two input terminals of the wiper motor 1 are connected to moveable contacts of first and second relays RL1 and RL2. In each of the relays RL1 and RL2, one of the fixed contacts is connected to a power line, and the remaining fixed contact is grounded. The system further comprises a position detecting plate 5 which includes an electroconductive disk member and turns in synchronism with the wiper motor M to detect the points of reversal of the wiper arm (not shown in the drawings) at the two extreme positions. The position detecting plate 5 includes a continuous circular segment 5a extending over 360 degrees, and a sector segment 5b extending over a limited angle integrally and coaxially with the continuous circular segment 5a. A first contact 6a and a second contact 6b are in sliding engagement with the continuous circular segment 6a and the sector segment 5b, respectively. The first contact 6a is grounded, and the second contact 6b is connected to an input terminal I2 of a controller 4 via an interface circuit.

The sector segment 5b extends over an angle which corresponds to the two points of reversal, and the second contact 6b comes into contact with the sector segment 5b as it reaches each point of reversal. When the second contact 6b is in contact with the sector segment 5b, the two contacts 6a and 6b are electrically connected to each other so that the input level at the input terminal I2 changes from a low ground level to a high power line level. The controller 4 can detect the point of reversal from the level of the signal at the input terminal I2.

When the wiper switch SW is closed and a high signal is thereby applied to an input terminal I1 of the controller 4, electric current is supplied to the motor M in the direction indicated by Ix, and the motor M starts to turn in the direction indicated by X. This rotation continues throughout the time the contact 6b is not in contact with the sector segment 5b. When the motor M has turned until the second contact 6b comes into contact with the sector segment 5b, and the signal resulting from the electric connection between the two contacts 6a and 6b is supplied to the controller 4 to indicate the arrival of the point of reversal, the state of the relays which was as illustrated in FIG. 1 changes to a new state in which the first relay RL1 is switched over, and the two input terminals of the motor M are both grounded. As a result, not only the supply of electric power to the motor M is terminated, but also a regenerative braking action is applied to the motor M because the two input terminals are directly connected to each other. This causes the motor M to come to an immediate stop. The regenerative braking action as used herein means a braking action which is produced in the motor when two input terminals thereof are connected either directly or via a low resistance path.

The controller 4 then issues a signal from an output terminal O2 after a prescribed time delay to switch over the state of the second relay RL2 so that electric current is conducted in the direction as indicated by arrow Iy. As a result, the motor M now turns in the direction indicated by arrow Y, and the sweeping direction of the wiper arm is reversed. Thereafter, this action is repeated until the wiper switch SW is turned off.

According to this system, there is a certain time lag from the time the second contact comes into contact with the sector segment 5b and the time the regenerative braking action of the motor actually starts. This is due to the provision of a CR constant which exists in the circuit associated with the position detecting plate 5. Such a CR constant in the circuit is necessary for ensuring a stable operation of the position detecting plate 5. Also, the operation of the relays involves a certain time delay. The sweeping speed of the wiper arm also changes depending on the presence of oil, dust and other matters on the surface of the windshield. Therefore, some fluctuation is inevitable in the distance by which the wiper blade moves from the point of reversal as defined by the position detecting plate and the point at which the regenerative braking action actually starts. Therefore, the actual terminal position of the wiper blade tends to change depending on the condition of the surface of the windshield. However, this is not commercially acceptable to the user.

BRIEF SUMMARY OF THE INVENTION

In view of such problems of the prior art, a primary object of the present invention is to provide a windshield wiper system using a reversible motor which can do away with a linkage mechanism for converting a rotational output of a motor into a reciprocating angular movement of a wiper arm.

A second object of the present invention is to provide a windshield wiper system using a reversible motor which can reverse its movement at a fixed location at all times.

A third object of the present invention is to provide a windshield wiper system using a reversible motor which is both simple in structure and reliable in use.

According to the present invention, these and other objects can be accomplished by providing a windshield wiper system for effecting an angular reciprocating movement of a wiper arm by reversibly controlling an electric motor, comprising: a reversible electric motor; a controller including first and second relay means for reversibly supplying electric current to the electric motor; and an electroconductive position detecting member attached to an output shaft of the electric motor, and comprising a first segment extending over a first angular range, a second segment extending over 360 degrees coaxially with the first segment, and a third segment extending over 360 degrees excluding a sector shaped opening which is coaxial with the first and second segments, and extends over a second angular range slightly greater than the first angular range, the electroconductive position detecting member supplying a control signal to the controller for detecting each point for reversing the supply of electric current to the motor in cooperation with first, second and third contacts placed in sliding engagement with the first, second and third segments, respectively; the third contact which is in sliding engagement with the third segment selectively providing a path for a regenerative braking action of the motor in cooperation with third relay means controlled by the controller.

Because the third relay means and the third position detecting segment are provided separately from those used for controlling the power supply of the electric motor, and are therefore relatively free from any large time constant, it is possible to start the regenerative braking action at a prescribed angular location without involving any substantial time lag so that the wiper arm can be stopped at a prescribed angular position at each terminal point at high precision at all times.

The third relay means can be controlled in a number of possible ways as long as it can provide a path for a regenerative braking action at an appropriate timing. According to a preferred embodiment of the present invention, a contact set of the third relay means is interposed in a grounding line of the first and second relay means in such a manner that the grounding line may be selectively connected to one of a ground line and the second contact, the first contact and the third contact being connected to a power line and a ground line, respectively. Additionally, an input of the controller may be connected to the second segment, and the controller may include an interface circuit which can detect a ground level and an intermediate voltage level.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 3:
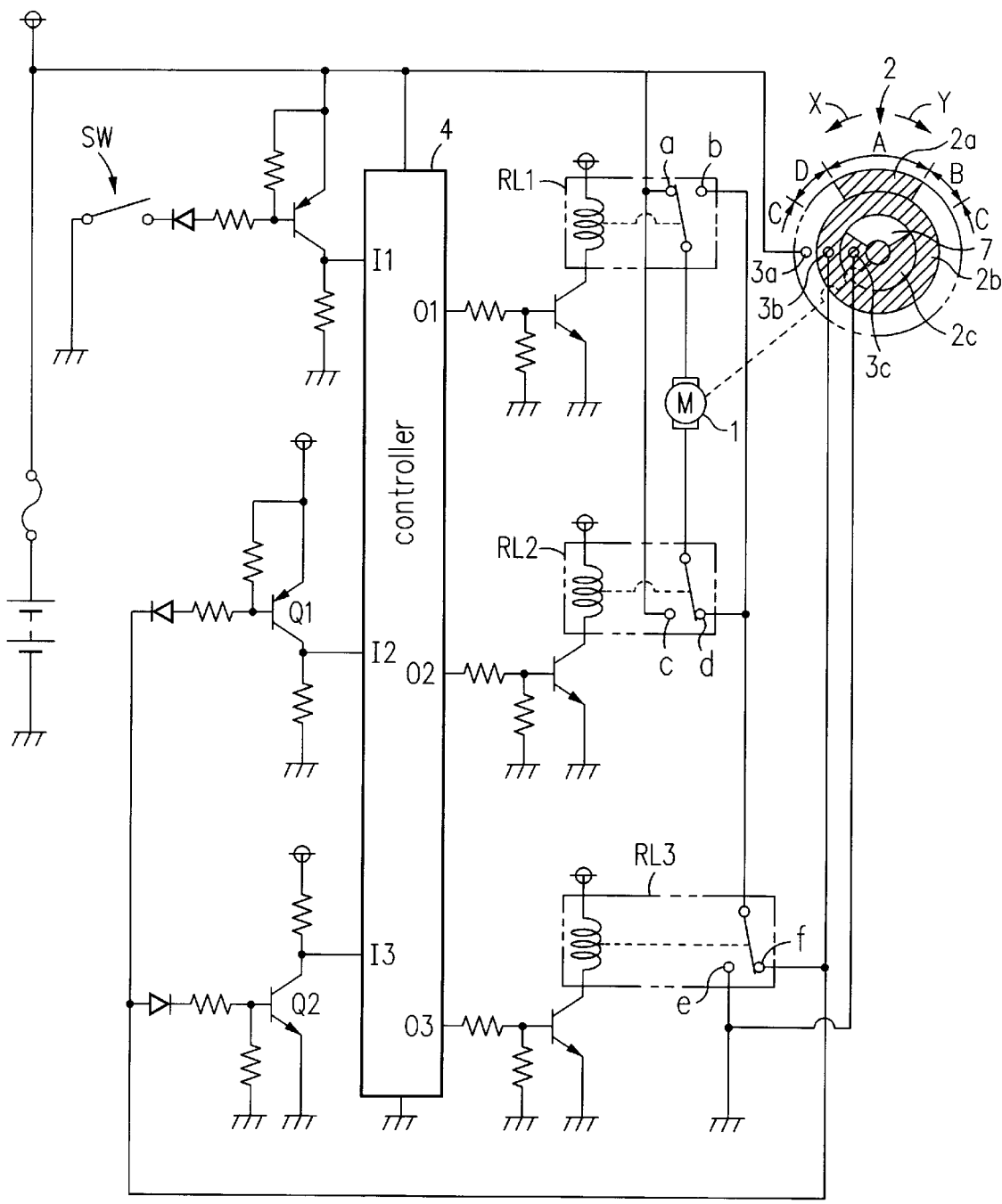
FIG. 3 is a circuit diagram of a preferred embodiment of the present invention.

FIG. 3 is a circuit diagram of an essential part of a first embodiment of the present invention, and the parts corresponding to those of FIG. 3 are denoted with like numerals. This embodiment comprises a position detecting member which includes a position detecting plate 2 and three contacts 3a, 3b and 3c in sliding engagement with the position detecting plate 2. The position detecting plate 2 turns in synchronism with the motor, and is made of electroconductive member which includes a first segment 2a corresponding to the sector segment 5b, a second segment 2b corresponding to the circular segment, and a third segment 2c extending over a large angle and defining a sector shaped opening therein. Normally, the position detecting plate 2 is secured coaxially to a worm wheel (not shown) which is turned by a worm (not shown) connected to an output shaft of the motor M. The three segments 2a, 2b and 2c included in the position detecting plate 2 are line-symmetric about a vertical line in FIG. 3, and the angular extent of the sector shaped opening 7 of the third segment 2c is slightly larger than that of the sector shaped first segment 2a.

Figure 1:
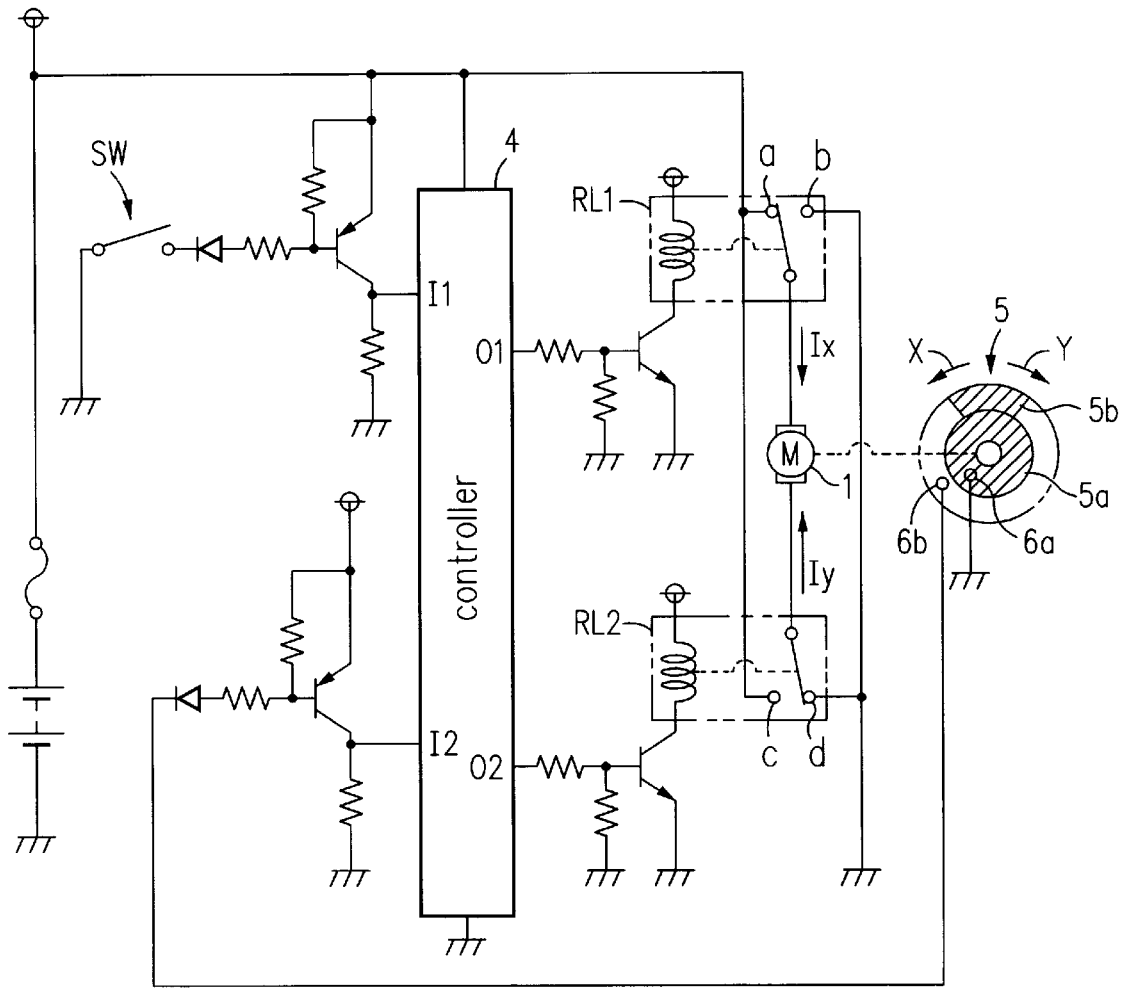
FIG. 1 is a circuit diagram of a conventional wiper system using a reversible motor.

The three contacts 3a, 3b and 3c are associated with the respective segments 2a, 2b and 2c of the position detecting plate 2 so as to define three possible states of contact over angular ranges indicated by A, B(D) and C in FIG. 1.

The two input terminals of the electric motor M are connected to the moveable contacts of the relays RL1 and RL2, and one of the fixed contacts of each of these relays is connected to a moveable contact of a third relay RL3 which is controlled by a signal from the controller 4 as described hereinafter. The remaining fixed contacts of the first and second relays RL1 and RL2 are connected to the power line. One of the fixed contacts f of the third relay RL3 is connected to the second contact 3b of the position detecting plate 2, and the other fixed contact e is grounded. The first contact 3a and the third contact 3c are connected to the power line and the ground, respectively. The second contact is also connected to the input terminals I2 and I3 of the controller 4 via transistors Q1 and Q2, respectively.

The transistor Q1 supplies a high level signal to the input terminal I1 when a voltage lower than a prescribed intermediate voltage is applied to its base. The transistor Q2 supplies a high level signal to the input terminal I2 when a ground level voltage is applied to its base.

Figure 2:
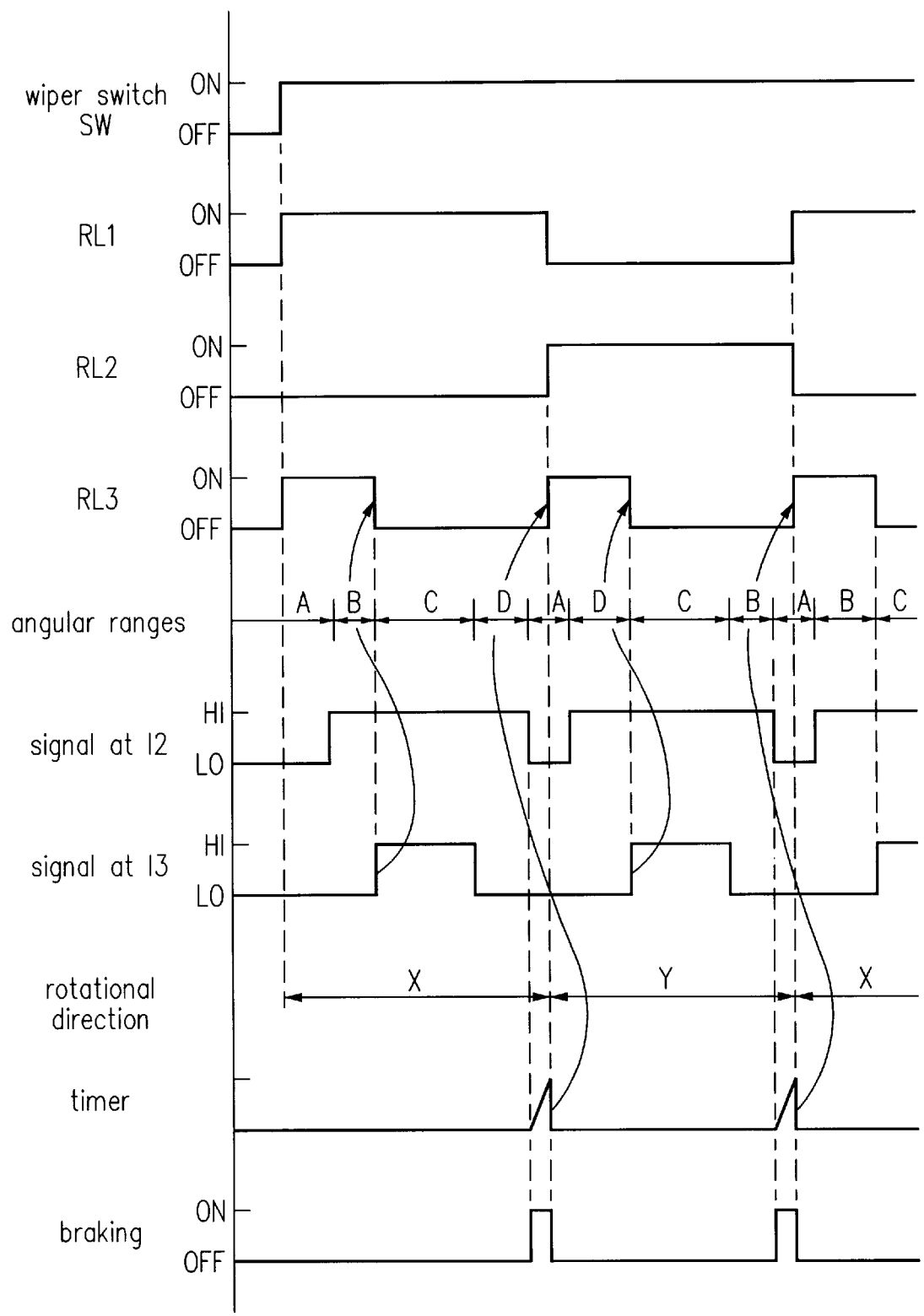
FIG. 2 is a time chart for showing the operation of the wiper system given in FIG. 3.

The mode of operation of this system is described in the following with reference to the time chart of FIG. 2. Initially, the angular position of the position detecting plate 2 is such that the contacts 3a, 3b and 3c are in range A. When the wiper switch SW is closed, the relays RL1 and RL3 are turned on, and the motor M starts turning in the direction indicated by X. In range A, the second contact 3b is electrically connected to the first contact 3a so that a high voltage is applied to the bases of the two transistors Q1 and Q2, and both the input terminals I2 and I3 are in a low state.

When the contacts move on to range B (owing to the rotation of the position detecting plate 2), the first contact 3a is placed out of contact from the electroconductive member, and the bases of the transistors Q1 and Q2, along with the second contact 3b, are placed at an intermediate voltage level by being connected to the power line via the electric motor M. As a result, the second input terminal I2 is placed at a high level while the third input terminal I3 remains at the low level. However, because the third relay RL3 still remains on, and the current continues to flow through the electric motor via the RL1, RL2 and RL3.

As the contacts move on to range C, the third contact 3c is now electrically connected to the second contact 3b while the first contact 3a remains out of contact from either of the remaining contacts. Because the bases of the transistors Q1 and Q2 are pulled down to the ground level, the second input terminal I2 is at a high level (the transistor Q1 is turned on), and the third input terminal I3 is also at a high level (the transistor Q1 is turned off). This state causes the third relay RL3 to be turned off, but the supply of electric current to the electric motor M continues via the relays RL1, RL2, and the second and third contacts 3b and 3c.

As the contacts further move onto range D, the electric connection between the second and third contacts 3b and 3c is broken, but the electric motor 3 continues to turn by inertia. This break in the connection between the second and third contacts 3b and 3c is necessary for avoiding short-circuiting.

As soon as the first contact 3a comes into contact with the first segment 2a, although the states of the two relays RL1 and RL2 are as illustrated in FIG. 3, the two input terminals of the electric motor M are directly connected with each other, and the motor M comes to an immediate stop by being subjected to a regenerative braking action. At the same time, a timer is set off as shown in FIG. 2, and upon time-up of this timer, the states of the three relays are reversed from the existing states. In other words, a state similar to the initial state is restored, but the rotational direction of the electric motor M is reversed from the initial state.

Thereafter, the motor turns in the direction indicated by arrow Y, and the above described process is repeated so that the motor carries out the desired reciprocating movement. It is possible that the regenerative braking action is produced at each terminal end of the angular wiping range. Thus, the motor M follows the operating ranges in the sequence of A-B-C-D-A-D-C-B-A-B-C-D-... But, it is also possible to provide a simple linkage mechanism in association with the motor so that the reversing action at one of the terminal ends of the angular wiping range is carried out by this linkage mechanism while the reversing action at the other of the terminal ends of the angular wiping range is electrically carried out with the aid of the regenerative braking action as described above. In this case, the motor operates over the ranges in the sequence of A-B-C-D-C-B-A-B-C-D-...

For instance, Japanese patent laid-open publication No. 7-165023 discloses a wiper motor incorporated with such a linkage mechanism which effects a reversing action at each terminal angular position of the wiper arm. Normally, the angular range mechanically defined by the linkage mechanism is set greater than the normal sweeping angle of the wiper arm during normal operation so that one of the mechanically defined terminal angular positions may be reserved for the retracted position of the wiper arm for retracting the wiper blade away from the vehicle operator's view, and the associated terminal angular position of the arm for the normal sweeping action may be defined by an electric arrangement such as the one disclosed in this application.

Thus, according to the present invention, instead of relying on the relays which are directly connected to the electric motor for reversibly controlling the motor for the regenerative braking of the motor, a separate relay and a separate position detecting segment are employed for determining the start of each regenerative braking action. The circuit associated with the separate relay and the separate position detecting segment are relatively free from any large time constant as it is not involved in the power circuit for actually driving the electric motor. Therefore, according to the present invention, the regenerative braking action occurs at a prescribed angular location without involving any substantial time lag so that the wiper arm can be stopped at a prescribed angular position at each terminal point at high precision at all times as opposed to the conventional arrangement which relies solely on the two relays for reversibly controlling the electric motor for carrying out a regenerative braking action at each terminal point of the wiper movement.

Although the present invention has been described in terms of a preferred embodiment thereof, it is obvious to a person skilled in the art that various alterations and modifications are possible without departing from the scope of the present invention which is set forth in the appended claims.

What we claim is:

1. A windshield wiper system for effecting an angular reciprocating movement of a wiper arm by reversibly controlling an electric motor, comprising:

a reversible electric motor;

a controller including first and second relay means for reversibly supplying electric current to said electric motor; and an electroconductive position detecting member attached to an output shaft of said electric motor, and comprising a first segment extending over a first angular range, a second segment extending over 360 degrees coaxially with said first segment, and a third segment extending over 360 degrees excluding a sector shaped opening which is coaxial with said first and second segments, and extends over a second angular range slightly greater than said first angular range, said electroconductive position detecting member supplying a control signal to said controller for detecting each point for reversing said supply of electric current to said motor in cooperation with first, second and third contacts placed in sliding engagement with said first, second and third segments, respectively;

said third contact which is in sliding engagement with said third segment selectively providing a path for a regenerative braking action of said motor in cooperation with third relay means controlled by said controller.

2. A windshield wiper system according to claim 1, wherein a contact set of said third relay means is interposed in a grounding line of said first and second relay means in such a manner that said grounding line may be selectively connected to one of a ground line and said second contact, said first contact and said third contact being connected to a power line and a ground line, respectively.

3. A windshield wiper system according to claim 2, wherein an input of said controller is connected to said second segment, and said controller includes an interface circuit which can detect a ground level and an intermediate voltage level.

* * * * *